(12) United States Patent
Chen et al.

(10) Patent No.: US 11,796,736 B2
(45) Date of Patent: Oct. 24, 2023

(54) ATHERMAL ARRAYED WAVEGUIDE GRATING

(71) Applicant: IRIXI PHOTONICS (SUZHOU) CO., LTD., Suzhou (CN)

(72) Inventors: Yifan Chen, Suzhou (CN); Rui Zheng, Suzhou (CN)

(73) Assignee: IRIXI PHOTONICS (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 17/632,629

(22) PCT Filed: Nov. 18, 2019

(86) PCT No.: PCT/CN2019/119100
§ 371 (c)(1),
(2) Date: Feb. 3, 2022

(87) PCT Pub. No.: WO2021/036009
PCT Pub. Date: Mar. 4, 2021

(65) Prior Publication Data
US 2022/0291448 A1    Sep. 15, 2022

(30) Foreign Application Priority Data
Aug. 30, 2019 (CN) .......................... 201910812393.9

(51) Int. Cl.
G02B 6/12 (2006.01)
G02B 6/122 (2006.01)

(52) U.S. Cl.
CPC ..... G02B 6/12028 (2013.01); G02B 6/12009 (2013.01); G02B 6/12026 (2013.01);
(Continued)

(58) Field of Classification Search
CPC ............ G02B 6/12028; G02B 6/12009; G02B 6/12026; G02B 6/12011; G02B 6/12016; G02B 6/1223
See application file for complete search history.

(56) References Cited

U.S. PATENT DOCUMENTS

2002/0122650 A1* 9/2002 Kominato .......... G02B 6/12011
                                              385/131
2004/0141689 A1   7/2004 Song et al.
(Continued)

FOREIGN PATENT DOCUMENTS

CN           1402070 A       3/2003
CN        108123365 A   *   6/2018
(Continued)

OTHER PUBLICATIONS

Hirota et al. ("Athermal Arrayed-Waveguide Grating Multi/Demultiplexers Composed of TiO2—SiO2 Waveguides on Si", IEEE Photonics Technology Letters, vol. 17, No. 2, Feb. 2005) (Year: 2005).*

*Primary Examiner* — Michelle R Connelly
(74) *Attorney, Agent, or Firm* — SZDC LAW P.C.

(57) ABSTRACT

An athermal arrayed waveguide grating includes a silicon-based substrate and an athermal arrayed waveguide disposed on the silicon-based substrate. The athermal arrayed waveguide includes a cladding layer and a waveguide chip layer, the waveguide chip layer is disposed on the cladding layer and has a refractive index greater than that of the cladding layer; the waveguide core layer includes multilayer structures having a periodic configuration, the multilayer structure includes two layers of silica material and a negative temperature coefficient material disposed between the two layers of silica material; the negative temperature coefficient material is used to compensate for a dimensional deformation of the silicon-based substrate after being heated. The
(Continued)

present invention simplifies the structure of the athermal arrayed waveguide grating, sets the negative temperature coefficient material in the waveguide core layer structure, and makes the final temperature coefficient of refractive index of the waveguide structure is a negative number.

3 Claims, 1 Drawing Sheet

(52) U.S. Cl.
CPC ...... *G02B 6/12011* (2013.01); *G02B 6/12016* (2013.01); *G02B 6/1223* (2013.01)

(56) References Cited

U.S. PATENT DOCUMENTS

| | | |
|---|---|---|
| 2011/0229080 A1 | 9/2011 | Bulthuis et al. |
| 2014/0212104 A1* | 7/2014 | Cho ........................ G02B 6/136 216/11 |
| 2019/0227232 A1 | 7/2019 | Venkatesan et al. |
| 2022/0276437 A1* | 9/2022 | Vulovic ............. G02B 6/12026 |

FOREIGN PATENT DOCUMENTS

| | | |
|---|---|---|
| CN | 108123365 A | 6/2018 |
| CN | 110376677 A | 10/2019 |
| CN | 210442536 U | 5/2020 |

* cited by examiner

ATHERMAL ARRAYED WAVEGUIDE GRATING

CROSS REFERENCE TO RELATED APPLICATIONS

This application is the national stage application of PCT/CN2019/119100, filed on Nov. 18, 2019, which claims priority of Chinese Patent Application No. 201910812393.9, filed Aug. 30, 2019, the entire disclosures of both of which are incorporated herein by reference.

FIELD OF THE INVENTION

The present invention relates to the planar optical waveguide devices, and belongs to an anthermal arrayed waveguide grating.

DESCRIPTION OF THE PRIOR ART

AWG (Arrayed Waveguide Grating) is a kind of angular-dispersion passive device, which based on planar optical waveguide technology and was first proposed by Smit in the late 1980s, and then it has attracted the attention of Bell Research Institute, NTT and other research institutions. With the development of planar optical waveguide technology, the corresponding products are gradually commercialized. Compared with other WDM (Wavelength Division Multiplexing) devices, AWG has the advantages of flexible design, low insertion loss, good filtering performance, long-term stability and easy coupling with optical fiber, etc. In addition, AWG is easy to be integrated with optical amplifier, semiconductor laser and other active devices, so as to realize monolithic integration, which is a hot research topic nowadays.

The correlation characteristics between the central wavelength of the AWG and the ambient temperature are described as follows:

$$\lambda_c = \frac{n_{eff} \cdot \Delta L}{m}$$

The above formula is the expression of the central wavelength of the AWG, where $n_{eff}$ is the effective refractive index of the waveguide, $\Delta L$ is the geometric length difference between adjacent waveguides, m is the diffraction order, which determines the dispersion ability of the optical grating. Both $n_{eff}$ and $\Delta L$ can be described by temperature-dependent functions. The central wavelength of the device varies with temperature by deriving the temperature from the formula above, and the final expression is as follows:

$$\frac{d\lambda_c}{dT} = \lambda_c \left( \frac{1}{n_{eff}} \frac{\partial n_{eff}}{\partial T} + \frac{1}{\Delta L} \frac{\partial \Delta L}{\partial T} \right)$$

Where, $$\frac{1}{\Delta L} \frac{\partial \Delta L}{\partial T} \approx \alpha_{sub},$$

and $\alpha_{sub}$ is the linear expansion coefficient of the substrate material of the AWG. In the AWG with silicon-based silica structure, the thickness of the silica structure is much smaller than that of the silicon-based structure, and the size deformation caused by the temperature change is mainly determined by the substrate material. Among them, $\alpha_{sub} \approx 2.6 \times 10^{-6}$, for the conventional silica waveguide, $$\frac{\partial n_{eff}}{\partial T} = 1 \times 10^{-5},$$

$n_{eff}$=1.456, and after comprehensive calculation, the temperature drift of the central wavelength is 0.012 nm/deg.

In order to keep the central wavelength of the AWG unchanged at different ambient temperatures and reduce the temperature drift coefficient of its central wavelength, the traditional technology is to use a temperature control device, such as heater or electric refrigerating unit to stable the working temperature of the AWG, which need to provide additional power input, and the use of active temperature control is limited in the working environment with large temperature difference. The conventional athermal technology requires additional mechanical structure to the grating to compensate the wavelength-temperature drift, which requires more complex structural design and process methods.

Therefore, it is necessary to provide an athermal arrayed waveguide grating with simple structure to solve the above problems.

BRIEF SUMMARY OF THE INVENTION

In order to solve the technical problems mentioned above, the present invention aims to provide an athermal arrayed waveguide grating, including waveguide structures with negative temperature characteristics, so as to realize the athermal operating mode of the devices by using the specially designed negative temperature variation characteristic.

To achieve the foregoing objective, the present invention is realized as an athermal arrayed waveguide grating, which includes: a silicon-based substrate; and the following structure disposed on the silicon-based substrate:

at least one input waveguide for inputting optical signal;

a first free transmission region, composed of a first planar waveguide and coupled with the output end of the input waveguide;

an athermal arrayed waveguide, coupled with the output end of the first free transmission region;

a second free transmission region, composed of a second planar waveguide and coupled with the output end of the athermal arrayed waveguide;

at least one output waveguide for outputting optical signal, coupled with the output end of the second free transmission region;

the athermal arrayed waveguide comprises a cladding layer and a waveguide core layer, the waveguide core layer is disposed in the cladding layer and has a refractive index greater than that of the cladding layer;

the waveguide core layer comprises multilayer structures having a periodic configuration, the multilayer structure comprises two layers of silica material and a negative temperature coefficient material disposed between the two layers of silica material; the negative temperature coefficient material is used to compensate for a dimensional deformation of the silicon-based substrate after being heated, so as to reduce the temperature drift coefficient of the athermal arrayed waveguide grating.

Further, the negative temperature coefficient material is titanium dioxide.

Further, in the multilayer structure, the thickness of the silica material is 0.5-1 μm, and the thickness of the titanium dioxide is 0.05-0.1 μm.

Further, the effective refractive index of the multilayer structure is 1.5-1.6.

Further, the effective temperature coefficient of refractive index of the multilayer structure is $-2e^{-6}$--$4e^{-6}$/k.

Further, the thickness of the negative temperature coefficient material is related to the optimal effective refractive index of the waveguide core layer.

Further, the thickness of the negative temperature coefficient material is related to the optimal effective temperature coefficient of refractive index of the waveguide core layer.

The beneficial effect of the present invention is: the technical scheme of the present invention overcomes a problem that the structure of the athermal arrayed waveguide grating is difficult to design, eliminates the additional structures and assembly processes, and simplifies the structure of the athermal arrayed waveguide grating. And by setting the negative temperature coefficient material in the waveguide core layer structure, the present invention makes the grating athermal, thus ensuring that the temperature drift coefficient of the grating satisfies requirements, and athermal operation conditions are met.

The above description is only an outline of the technical schemes of the present invention. Preferred embodiments of the present invention are provided below in conjunction with the attached drawings to enable one with ordinary skill in the art to better understand said and other objectives, features, and advantages of the present invention and to make the present invention accordingly.

DETAILED DESCRIPTION OF THE PREFERRED EMBODIMENTS

Specific embodiments of the present invention are described in further detail in combination with the related drawings and embodiments below. However, in addition to the descriptions given below, the present invention can be applied to other embodiments, and the scope of the present invention is not limited by such, rather by the scope of the claims.

Embodiment 1

Figure 1:
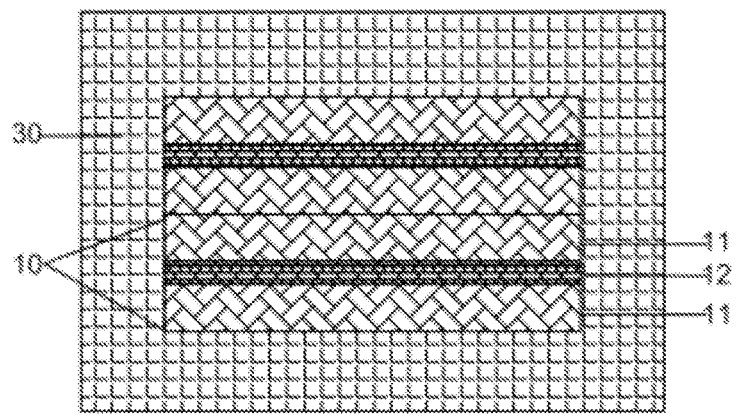
FIG. 1 is a structural diagram depicting the athermal arrayed waveguide grating in embodiment 1 of the present invention, where, 10—multilayer structures, 11—silica material, 12—negative temperature coefficient material, 30—silica cladding layer.

Referring to FIG. 1, which shows an athermal arrayed waveguide, including a silica cladding layer (30) and a waveguide core layer disposed in the cladding layer (30), the waveguide core layer comprises multilayer structure (10), which comprises two layers of silica material (11) and negative temperature coefficient material (12) disposed between the two layers of silica material; the negative temperature coefficient material (12) is used to compensate for a dimensional deformation of the silicon-based substrate (140) after being heated, so as to reduce the temperature drift coefficient of the athermal arrayed waveguide grating.

In this embodiment, the refractive index of the waveguide core layer is greater than that of the silica cladding layer (30).

In the embodiment, the negative temperature coefficient material (12) is titanium dioxide.

In the embodiment, in the multilayer structure (10), the thickness of the silica material (11) is 0.5-1 μm, and the thickness of the titanium dioxide (12) is 0.05-0.1 μm. The thickness of the negative temperature coefficient material (12) is related to the optimal effective refractive index of the waveguide core layer. For example, when the thickness of the silica material (11) is 1 μm, the thickness of the titanium dioxide (12) is 0.1, and the thickness of the multilayer structure (10) is 4.2 μm: the effective refractive index of the silica material (11) is 1.476, and of which the effective temperature coefficient of refractive index is $7.6e^{-6}$/k; the effective refractive index of the titanium dioxide (12) is 2.614, and of which the effective temperature coefficient of refractive index is $-1.2e^{-4}$/k; the effective refractive index of the multilayer structure (10) is 1.5795, and of which the effective temperature coefficient of refractive index is $-4e^{-6}$/k.

In other embodiments, the effective refractive index of the multilayer structure (10) is 1.5-1.6.

In other embodiments, the optimal effective temperature coefficient of refractive index of the waveguide core layer is $-2e^{-6}$--$4e^{-6}$/k.

A two-period multilayer structure (10) is shown in the embodiment depicted in FIG. 1, but the number and thickness of the multilayer structure (10) in the present invention is not limited to this embodiment.

Embodiment 2

Figure 2:
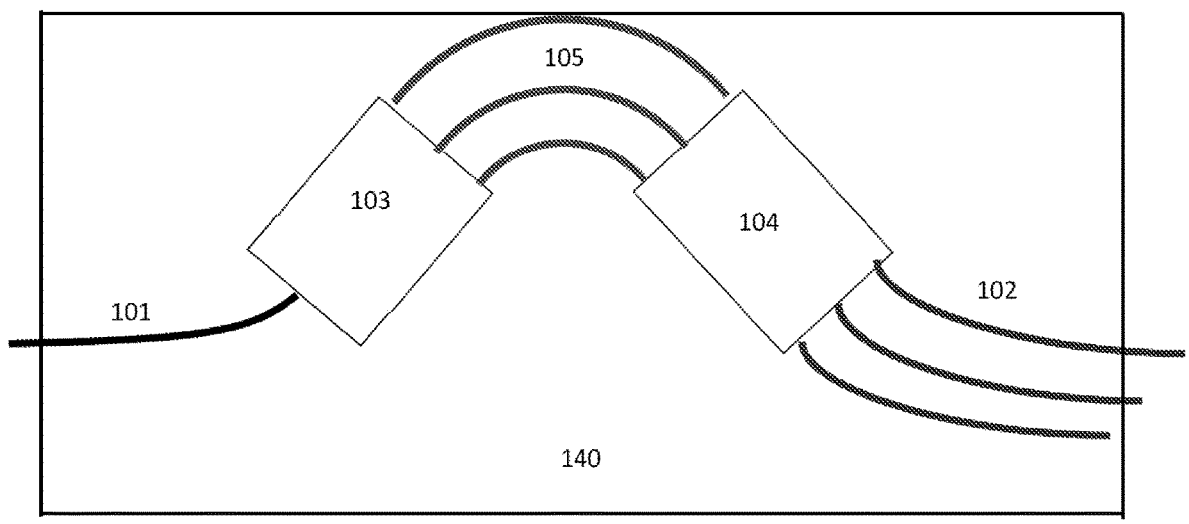
FIG. 2 is a structural diagram depicting the athermal arrayed waveguide grating in embodiment 2 of the present invention, where, 101—input waveguide, 102—output waveguide, 103—first free transmission region, 104—second free transmission, 105—athermal arrayed waveguide, 140—silicon-based substrate.

Referring to FIG. 2, the present invention also shows an athermal arrayed waveguide grating device, which includes a silicon-based substrate (140), and the following structure disposed on the silicon-based substrate (140):

one input waveguide (101) for inputting optical signal;

a first free transmission region (103), composed of a first planar waveguide and coupled with the output end of the input waveguide (101);

the athermal arrayed waveguide (105) shown in the embodiment 1, coupled with the output end of the first free transmission region (103);

a second free transmission region (104), composed of a second planar waveguide and coupled with the output end of the athermal arrayed waveguide (105);

and at least one output waveguide (102) for outputting optical signal, coupled with the output end of the second free transmission region (104).

The temperature drift coefficient of the central wavelength of the grating device with the waveguide structure above is calculated as −0.0014 nm/deg, while the temperature drift coefficient of the central wavelength of the arrayed waveguide grating with silicon-based silica substrate is calculated as 0.012 nm/deg, which is reduced by one order of magnitude.

The present invention makes the waveguide get a negative temperature characteristic by improving the design of the waveguide structure, so as to eliminate the influence caused by the thermal expansion coefficient of silicon-based materials in the grating device, greatly reduce the overall temperature drift coefficient of the arrayed waveguide grating device, and improve the performance of the device.

The technical features of the above embodiments can be combined arbitrarily, in order to make the description concise, not all possible combinations of the technical features in the above embodiments are described. However, as long as there is no contradiction between the combination of these technical features, they shall be considered to be within the scope of this specification.

The present invention only described several above embodiments, which are described more specific and detailed, but it cannot be understood as a limitation on the scope of the present invention. It should be pointed out that for ordinary technical personnel in the art, without departing from the concept of the present invention, a number of deformation and improvements can be made, which belong to the scope of the present invention. Therefore, the scope of the present invention shall be subject to the recorded claims.

The invention claimed is:

1. An athermal arrayed waveguide grating, comprising: a silicon-based substrate; and the following structure disposed on the silicon-based substrate:
    at least one input waveguide for inputting optical signal;
    a first free transmission region, composed of a first planar waveguide and coupled with an output end of the input waveguide;
    an athermal arrayed waveguide, coupled with an output end of the first free transmission region;
    a second free transmission region, composed of a second planar waveguide and coupled with an output end of the athermal arrayed waveguide;
    at least one output waveguide for outputting optical signal, coupled with an output end of the second free transmission region;
    the athermal arrayed waveguide comprises a cladding layer and a waveguide core layer, the waveguide core layer is disposed in the cladding layer and has a refractive index greater than that of the cladding layer;
    the waveguide core layer comprises multilayer structures having a periodic configuration, each multilayer structure comprises two layers of silica material and a negative temperature coefficient material disposed between the two layers of silica material; the negative temperature coefficient material is used to compensate for a dimensional deformation of the silicon-based substrate after being heated, so as to reduce the temperature drift coefficient of the athermal arrayed waveguide grating,
    wherein the negative temperature coefficient material is titanium dioxide;
    wherein in the each multilayer structure, the thickness of the silica material is 0.5-1 μm, and the thickness of the titanium dioxide is 0.05-0.1 μm;
    wherein the effective refractive index of the each multilayer structure is 1.5-1.6; and
    wherein the effective temperature coefficient of refractive index of the each multilayer structure is $-2e^{-6}$--$4e^{-6}$/k.

2. The athermal arrayed waveguide grating to claim 1, wherein the thickness of the negative temperature coefficient material is related to the optimal effective refractive index of the waveguide core layer.

3. The athermal arrayed waveguide grating to claim 1, wherein the thickness of the negative temperature coefficient material is related to the optimal effective temperature coefficient of refractive index of the waveguide core layer.

* * * * *